Jan. 14, 1958 J. SEIFERT 2,819,916
WOUND WIRE HOSE COUPLING MEANS
Filed July 15, 1953 4 Sheets-Sheet 1

INVENTOR
Julius Seifert
BY: Michael A. Striker
agt

Jan. 14, 1958   J. SEIFERT   2,819,916
WOUND WIRE HOSE COUPLING MEANS
Filed July 15, 1953   4 Sheets-Sheet 2

INVENTOR
Julius Seifert
BY: Michael S. Striker
    agt.

Jan. 14, 1958 J. SEIFERT 2,819,916
WOUND WIRE HOSE COUPLING MEANS
Filed July 15, 1953 4 Sheets-Sheet 3

INVENTOR
Julius Seifert
BY: Michael S. Striker
agt.

Jan. 14, 1958 J. SEIFERT 2,819,916
WOUND WIRE HOSE COUPLING MEANS
Filed July 15, 1953 4 Sheets-Sheet 4

INVENTOR
Julius Seifert
By Michael S. Striker
agt

United States Patent Office 2,819,916
Patented Jan. 14, 1958

2,819,916

WOUND WIRE HOSE COUPLING MEANS

Julius Seifert, Munich, Germany; Ursula Seifert, sole heir of the estate of said Julius Seifert, deceased Application July 15, 1953, Serial No. 368,164

Claims priority, application Germany March 1, 1952

3 Claims. (Cl. 285—244)

The present invention relates to connecting devices and more particularly to connecting devices which are adapted to connect flexible hoses and the like to rigid tubular members and the like.

The known connecting devices for accomplishing similar results have several disadvantages among which are the great amount of time and trouble required to effect the connection and disconnection of a hose or similar flexible tubular member from a rigid tube or the like.

One of the objects of the present invention is to overcome the above drawbacks by providing a very simple connecting device capable of very quickly fixing a hose or the like to a tubular member, for example.

Another object of the present invention is to provide a connecting device which may be very quickly and easily released to enable a hose or the like to be disconnected from a tubular member or the like.

A further object of the present invention is to provide a connecting device which is of an exceedingly simple construction and whose parts may be be easily and quickly assembled and disassembled.

With the above objects in view, the present invention mainly consists of an apparatus for connecting an end portion of a flexible hose or the like to an end portion of a rigid tubular member extending into the flexible hose, this apparatus including an elongated helically wound wire adapted to extend about the hose at the part thereof which overlaps the tubular member. A pair of annular members are respectively connected to opposite end portions of the wire, are coaxial with each other and adapted to be located about the axis of the hose, and are rotatable with respect to each other so as to tension the wire and press the windings thereof against the hose to press the latter against a rigid tubular member extending into the same. A releasable lock means extends between the annular members to prevent rotation thereof under the influence of the tensioned wire so as to maintain the latter tensioned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
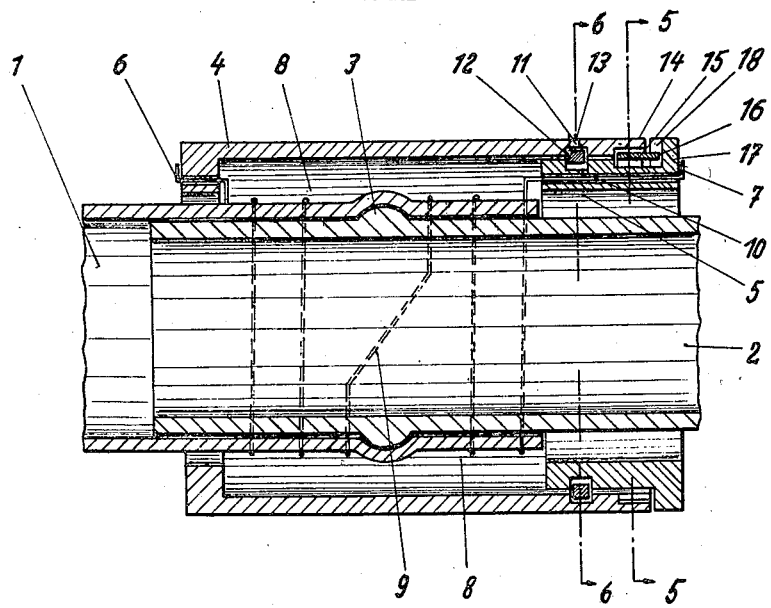
Fig. 1 is a fragmentary sectional view of a hose and tubular member having the apparatus of the invention located about the same, this apparatus of the invention being shown in section.

Referring now to the drawings, it will be seen that in Fig. 1 the structure of the invention is applied to an end portion of a hose 1 into which an end portion of a tubular member 2 extends, this tubular member 2 being provided with one or more annular enlargements 3 which make it difficult for the hose 1 to slip off the tubular member 2. The hose 1 extends over the enlargement 3 shown in Fig. 1.

Figure 4:
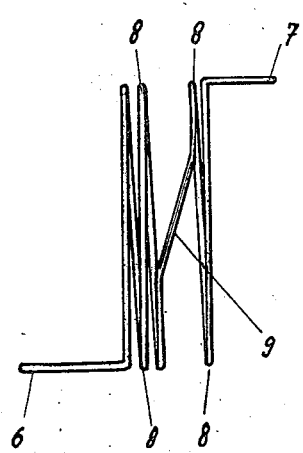
Fig. 4 is an elevational view of a wire used with the apparatus of the invention.

As is apparent from Fig. 1, a pair of annular members 4 and 5 are arranged coaxially with respect to each other and extend about the axis of hose 1. A wire, band, or the like is helically wound about the part of hose 1 located on the member 2, and in the particular example shown in Fig. 1 the wire 8 has the helical windings thereof located against the outer surface of the hose 1, and the opposite ends 6 and 7 of the wire 8 are respectively fixed to the annular members 4 and 5 as by passing through bores of these annular members in the manner shown in Fig. 1. The wire 8 is shown by itself in Fig. 4 from which it is evident that the ends 6 and 7 of the wire 8 are respectively bent at substantially right angles from the endmost convolutions of the wire 8, and Fig. 1 clearly shows how the extremities of end portions 6 and 7 are again bent at substantially a right angle at the exterior of the annular members 4 and 5, respectively, so that the wire 8 is securely fastened to the annular members 4 and 5.

The wire 8 is provided with an intermediate portion 9 of a greater pitch than the remainder of wire 8, and this portion 9 is located at that part of the wire 8 which extends across the enlargement 3 of member 2 so that the windings of wire 8 are not located on enlargement 3 and instead are distributed on opposite sides of the enlargement 3, in the manner shown in Fig. 1. The provision of the portion 9 in wire 8 prevents one or more convolutions of the wire 8 from becoming located over the enlargement 3 when the wire 8 is tensioned. The location of one or more convolutions of the wire on the enlargement 3 is undesirable because such convolutions can slip off the enlargement 3 after the wire is tensioned and cause the wire to become loose.

The annular members 4 and 5 are turnable with respect to each other in opposite directions for tensioning the wire 8, and these members 4 and 5 may be held together in many different ways. In the example shown in Fig. 1, the inner annular member 5 is formed in its outer face, at the part thereof which overlaps the outer annular member 4, with an annular groove 10, and any suitable means such as a pin or screw fixed to the outer member 4 may extend into the groove 10 to prevent substantial axial displacement of members 4 and 5 with respect to each other while permitting free rotation of annular members 4 and 5 with respect to each other.

Figure 6:
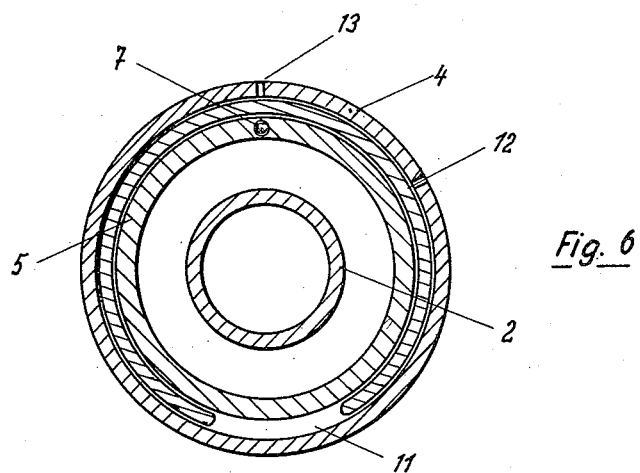
Fig. 6 is a sectional view taken along line 6—6 of Fig. 1 in the direction of the arrows.

A particularly desirable arrangement is shown in Fig. 1 according to which the part of the outer annular member 4 which overlaps the inner annular member 5 is formed at its inner face with an annular groove 11 directed toward and located opposite the groove 10. A split ring 12 of a springy material and of a rectangular cross section extends in its unstressed condition partly into both of the grooves 10 and 11 to prevent substantial axial displacement of annular members 4 and 5 with respect to each other while freeing these members for rotation with respect to each other. The structure of split ring 12 is clearly evident from Figs. 1 and 6, and, as is evident from Figs. 1 and 6, the outer annular member 4 is formed with at least two cutouts in the form of bores 13 communicating with the grooves 11 and through which pins or the like may be inserted to compress the split ring 12. The depth of groove 10 is at least as great as the thickness of split ring 12 so that when the ends of the latter are located opposite the openings 13 shown in Fig. 6, pins may be inserted through these openings to compress the ring 12 and locate the latter entirely within the groove 10 to enable the annular members 4 and 5 to be axially displaced and separated from each other.

Any suitable releasable lock means may be provided to prevent rotation of annular members 4 and 5 with respect to each other under the influence of the tensioned wire 8 so that the latter may be maintained in its tensioned condition. For example, the overlapping part of the inner annular member 5 may be formed with a plurality of small openings arranged close to each other in an annular row, and the overlapping part of the outer annular member 4 may be provided with one or more similar openings located opposite the annular row of openings in member 5 and being aligned with one of these latter openings when the wire 8 is sufficiently tensioned so that a pin, screw, or the like may extend through the opening of the outer annular member 4 into an opening of the inner annular member 5 to releasably lock these annular members together. With this arrangement. it is only necessary to remove the pin, screw, or the like from the opening in the inner annular member 5 in order to release these members so that the angular relationship of annular members 4 and 5 with respect to each other may be changed.

Figure 5:
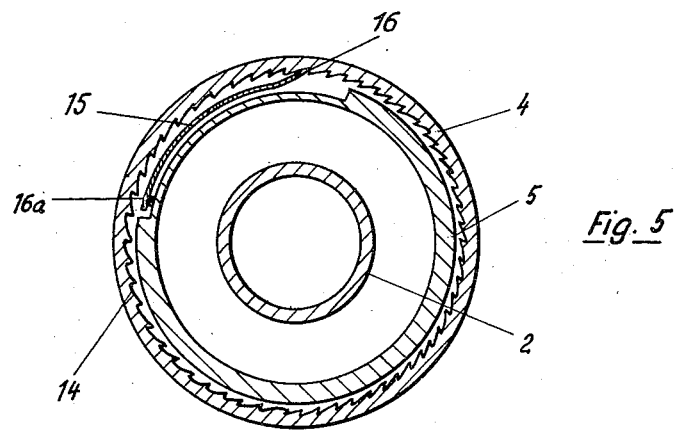
Fig. 5 is a sectional view taken along line 5—5 of Fig. 1 in the direction of the arrows.
Figure 7:
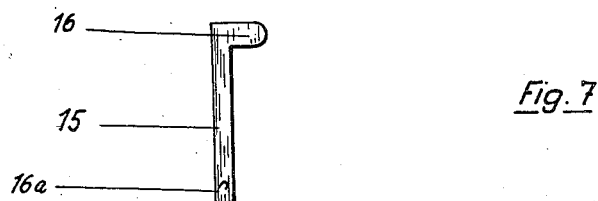
Fig. 7 is an elevational view of a leaf spring forming part of a ratchet mechanism for preventing release of the connecting device of the invention.

It is also possible to prevent rotation of members 4 and 5 automatically through the medium of a releasable lock means in the form of a pawl and ratchet, and such an arrangement is shown in Figs. 1 and 5. As is shown in Fig. 5, the inner face of the overlapping part of outer annular member 4 is formed at the extreme end portion thereof with ratchet teeth 14 which extend in the direction which opposes rotation of member 4 under the influence of the tensioned wire 8. A pawl in the form of a leaf spring 15 is located between members 4 and 5 opposite the annular row of ratchet teeth 14 and is fixed at end 16a to the outer face of the inner annular member 5. The leaf spring 15 extends from its fixed end 16a in a direction opposite to that in which the teeth 14 extend, and the free end 16 of pawl 15 presses resiliently against teeth 14 to automatically engage the latter. In order to provide a secure engagement of the ratchet mechanism and in order to facilitate the release thereof, the free end 16 of leaf spring 15 is widened as shown most clearly in Fig. 7.

In order to fasten the hose 1 to the tubular member 2 with the structure of the invention it is only necessary to slip the windings of wire 8 over the hose 1 and turn the members 4 and 5 with respect to each other in that direction which causes the convolutions of wire 8 to contract so that the wire 8 is tensioned and tightly pressed against the hose 1. The turning of members 4 and 5 in that direction which loosens the wire 8 is automatically prevented by the engagement of end 16 of the springy pawl 15 with the teeth 14. If the teeth 14 are made small enough, it is possible to tension the wire 8 sufficiently to connect the hose 1 to the tubular member 2 in a fluid-tight manner. In practice a spacing of approximately 2–4 mm. from one tooth to the next tooth has proved to be suitable for this purpose.

As is shown in Fig. 5, the free end 16 of leaf spring 15 is bent outwardly away from the axis of the annular members, and, as is shown in Fig. 1, the widened end 16 of leaf spring 15 extends beyond the overlapping end portion of the outer annular member 4. Thus, in order to release the annular members 4 and 5 to the influence of the tensioned wire 8 so that the latter may be loosened to permit separation of hose 1 and tube 2 from each other, it is only necessary to press end 16 of leaf spring 15 inwardly toward the axis of the annular members with any pointed instrument or the like. The resiliency of the tensioned wire is augmented by the resiliency of the compressed part of the hose 1 engaging the wire 8 so that when the releasable lock means in the form of ratchet 14, 15 is released, the wire itself together with the resiliency of the hose 1 will be sufficient to loosen the wire to an extent which permits the hose to be easily drawn off from the member 2.

As was pointed out above, the widened end 16 of leaf spring 15 extends beyond the end of the overlapping part of outer annular member 4. It is undesirable, however, to make the end 16 of leaf spring 15 easily accessible since it may then be inadvertently pressed to release members 4 and 5 at an undesired time. Such an inadvertent release of the ratchet mechanism would be likely to occur when the invention is applied to fire hose because such fire hoses are usually dragged over obstacles having a variety of shapes. Therefore, the inner annular member 5 is provided with a shoulder or flange 17 located opposite the end of the outer annular member 4, and this shoulder 17 is formed with a recess 18 facing the end face of annular member 4 and into which the free end 16 of leaf spring 15 extends. In this way the end 16 of the leaf spring 15 is rendered inaccessible except to pointed instruments or the like which must be inserted into the recess 18 to engage end 16 of leaf spring 15 for releasing the ratchet mechanism.

Figure 2:
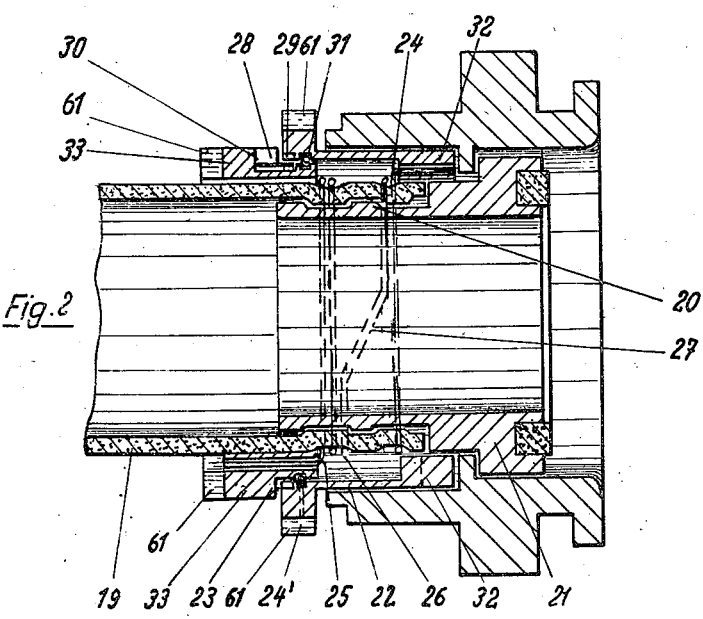
Fig. 2 is a sectional view of an embodiment of the invention particularly suited for fire hoses.

Fig. 2 of the drawings shows the structure of the invention applied to a fire hose 19 which is attached to a coupling member 21 which is provided with an annular enlargement 20 over which the hose 19 extends. An outer annular member 22, corresponding to outer annular member 4 of Fig. 1, and an inner annular member 23, corresponding to inner annular member 5 of Fig. 1, are located about the hose 19. A wire 26 similar to wire 8 has its opposite ends 24 and 25 respectively connected to annular members 22 and 23 in the same way that ends 6 and 7 of wire 8 are respectively connected to annular members 4 and 5, and the wire 26 is provided with an intermediate portion 27 of enlarged pitch extending over the annular enlargement 20 of coupling member 21 so that the convolutions of wire 26 are located on opposite sides of the enlargement 20.

A pawl in the form of a leaf spring 28 is fixed to the outer face of inner annular member 23 in the same way that leaf spring 15 is fixed to the outer face of annular member 5, and the free end of the leaf spring 28 engages ratchet teeth 29 formed on the inner face of outer annular member 22 in the same way that teeth 14 are formed on outer annular member 4 so that the annular members 22 and 23 may be releasably locked against turning movement under the influence of tensioned wire 26. As is evident from Fig. 2, the free end of leaf spring 28 is widened and extends into a recess 30 formed in a shoulder 33 of annular member 23 so that the releasable lock means of Fig. 2 may be released upon inserting a pointed instrument or the like into recess 30 and into engagement with leaf spring 28 to press the free end thereof inwardly toward the axis of annular members 22 and 23.

A springy split ring 31 extends partly into a groove of annular member 22 and partly into a groove of annular member 23 to prevent substantial axial displacement of annular members 22 and 23 with respect to each other while freeing these annular members for rotation with respect to each other, and the outer annular member 22 is formed with bores 24' communicating with groove into which split ring 31 extends so that the latter may be compressed and located entirely within the groove of inner annular member 23 to permit axial displacement and separation of members 22 and 23 in the same way that annular members 4 and 5 may be separated from each other upon pressing of split ring 12 into groove 10.

In order that the invention may be used with other conventional fire hose apparatus, the outer annular member 22 is provided at one end with several, for example four, coupling nipples 32 which space the parts from each other at the same distance that the conventional slip ring of known fire hoses spaces the parts. Flange 33 of inner annular member 23, in which the recess 30 is formed, prevents the hose 19 from becoming injured on the sharp end of coupling member 21 when the hose is pulled around sharp edges or corners.

Figure 3:
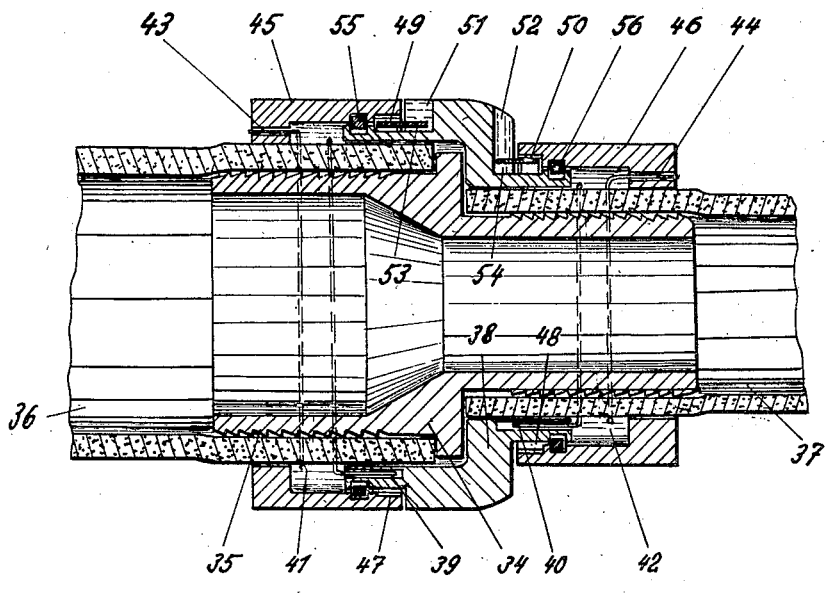
Fig. 3 is a sectional view of an embodiment of the invention adapted to connect a pair of hoses of different diameters to a reduction tube.

The invention may also be used to connect two hoses of the same diameter or two hoses of different diameters with the aid of a reduction tube, as shown in Fig. 3. According to this embodiment of the invention, the reduction tube 34, instead of being provided with annular enlargements, is provided with a series of annular hook-like teeth which engage the hoses 36 and 37 and which extend in directions respectively opposing withdrawal of hoses 36 and 37 from the reduction tube 34.

An annular member 38 has an enlarged end extending about hose 36 and a reduced end extending about hose 37. An end 39 of helically wound wire 41 is fixed to the enlarged end of annular member 38 while end 40 of helically wound wire 42 is fixed to the reduced end of annular member 38. These ends 39 and 40 of wires 41 and 42, respectively, may be pressed into bores of member 38 or may be fixed thereto in any other suitable way. The opposite ends 43 and 44 of wires 41 and 42 are respectively fixed to outer annular members 45 and 46 in the same way that the above-described wires are fixed to the annular members.

The annular members 45 and 46 are formed at the inner faces of their inner overlapping end portions which extend over member 38 with ratchet teeth 47 and 48, respectively, similar to ratchet teeth 14, and springy pawls in the form of leaf springs 49 and 50 are fixed to the annular pawl 38, are respectively located opposite the ratchet teeth 47 and 48, and respectively have free widened ends 53 and 54 resiliently pressing against ratchet teeth 47 and 48 to form a releasable lock means therewith for automatically preventing turning movement of annular members 45, 38, and 46 under the influence of tensioned wires 41 and 42 which press the hoses 36 and 37, respectively, against the teeth 35 of reduction tube 34 to fasten these hoses to the reduction tube. The widened ends 53 and 54 of leaf springs 49 and 50 respectively extend into recesses 51 and 52 formed in shoulders of annular member 38 so that the releasable lock means of Fig. 3 may be released upon insertion of pointed instruments or the like into recesses 51 and 52 to press free ends 53 and 54 of leaf springs 49 and 50 inwardly away from ratchet teeth 47 and 48, respectively.

A springy split ring 55 extends in its unstressed condition partly into a groove of annular member 38 and partly into a groove of annular member 45, and a springy split ring 56 extends in its unstressed condition partly into a groove of annular member 38 and partly into a groove of annular member 46 so that all three annular members 45, 38, and 46 are free to rotate with respect to each other but are prevented from being axially displaced with respect to each other. The annular members 45 and 46 are formed with openings through which pins may be inserted to compress split rings 55 and 56 entirely into the grooves of annular member 38, respectively, in the same way as was described above in connection with split ring 12, to permit annular members 45 and 46 to be axially displaced and separated from annular member 38.

Since the reduction tube 34 is not provided with annular enlargements over which hoses 36 and 37 extend, the wires 41 and 42 are not provided with intermediate portions of enlarged pitch.

Thus, the embodiment of Fig. 3 essentially includes two of the devices shown in Fig. 1, the annular member 38 forming an inner annular member which cooperates with both of the outer annular members 45 and 46. It is evident that the outer annular members 45 and 46 may be rotated with respect to annular member 38 to tension wires 41 and 42, respectively, so as to fasten hoses 36 and 37 to the reduction tube 34 in a fluid-tight manner. It is particularly desirable to arrange the annular members 45 and 46 for rotation in opposite directions with respect to each other upon tensioning of both wires 41 and 42 so that it is unnecessary to turn annular member 38, and, in fact, with such an arrangement it is possible to simply hold one of the annular members 45 and 46 stationary while turning only the other of these annular members in order to tension both wires 41 and 42.

Figure 8:
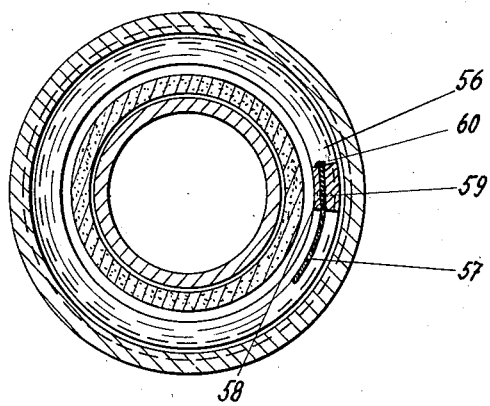
Fig. 8 is a sectional view illustrating how a wire may have an end thereof connected to other apparatus of the invention.
Figure 9:
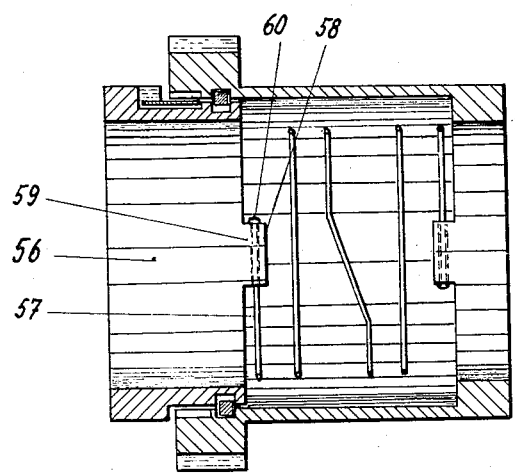
Fig. 9 is a sectional elevational view showing a wire connected to other apparatus of the invention in the manner illustrated in Fig. 8.

A particularly desirable manner of connecting the ends of the tensioned wire to the annular members of any of the embodiments of the invention is shown in Figs. 8 and 9. With the embodiments of Figs. 1, 2 and 3 the ends of the wire are bent at substantially right angles in order to extend into bores of the annular members. However, no such bend is provided with the wire 57 of Figs. 8 and 9. As is shown in Figs. 8 and 9, the end face of the overlapping part of the inner annular member 56 is provided with a projection 58 which is arcuately curved in the same way as the annular member 56 and which extends axially from the end of the annular member 56. This projection 58 is formed with a bore 59 through which the end of the wire 57 extends and the extremity of this end of the wire is enlarged at 60, by welding, riveting, or the like, so that the wire 57 cannot be withdrawn from the bore 59 and at the same time no right-angle bend is required at the end of the wire.

The outer annular member shown in Fig. 9 is formed with an inner shoulder having a projection extending toward the inner annular member 56 and formed with a bore through which the right end of wire 57 extends in the same way as the left end thereof shown in Fig. 9. Thus, the strength of the wire 57 is greatly increased because there are no sharp bends in it. It is to be understood that the wire fastening arrangement of Figs. 8 and 9 may be applied to any of the above-described embodiments of the invention, the annular member 56 corresponding to any of the above-described inner annular members and being shown in Fig. 9 together with an outer annular member corresponding to any of the above-described outer annular members.

In order to facilitate gripping of the annular members one or both of the annular members may be provided with projections 61 at their outer face, as shown in Fig. 2, or they may be provided with a knurled or otherwise roughened outer surface.

It should be noted that with all of the above-described embodiments of the invention the ratchet teeth are located at the extremities of the outer annular members so that when the springy split rings are pressed into the grooves of the inner annular members, the annular members may be separated from each other with the free end of the springy pawl member simply slipping laterally out of the ratchet teeth, so that the releasable lock means of the invention does not in any way hinder separation of the annular members from each other.

It will be understood that each of the elements described above, or two or more together, may also find a useful application in other types of apparatus for connecting hoses and the like to tubular members and the like differing from the types described above.

While the invention has been illustrated and described as embodied in releasable apparatus for connecting hoses and the like to tubular members and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for connecting an end portion of a flexible hose or the like to an end portion of a rigid tubular member extending into the flexible hose, comprising, in combination, an elongated helically wound wire adapted to extend about the hose at the part thereof which overlaps the tubular member, said wire having an intermediate portion of a pitch substantially larger than the remainder of said wire and adapted to pass over an enlarged part of the tubular member; a pair of annular members respectively connected to opposite end portions of said wire, being coaxial with each other and adapted to be located about the axis of the hose, and being rotatable with respect to each other so as to tension said wire and press the windings thereof against the hose to press the latter against a rigid tubular member extending into the same; and releasable lock means extending between said annular members to prevent rotation thereof under the influence of the tensioned wire so as to maintain the latter tensioned.

2. Apparatus for connecting an end portion of a flexible hose or the like to an end portion of a rigid tubular member extending into the flexible hose, comprising, in combination, an elongated helically wound wire adapted to extend about the hose at the part thereof which overlaps the tubular member; a pair of annular members respectively connected to opposite end portions of said wire, being coaxial with each other and adapted to be located about the axis of the hose, and being rotatable with respect to each other so as to tension said wire and press the windings thereof against the hose to press the latter against a rigid tubular member extending into the same, one of said annular members having an end portion of a smaller diameter than the remainder of said one annular member located distant from the other of said annular members; releasable lock means extending between said annular members to prevent rotation thereof under the influence of the tensioned wire so as to maintain the latter tensioned; a third annular member located adjacent said end portion of said one annular member and being coaxial therewith; a second helically wound wire having opposite ends respectively connected to said third annular member and said one of said pair of annular members and adapted to extend about a second hose located about a reduced part of a tubular member extending into the first mentioned hose; and second releasable lock means extending between said third annular member and said one annular member to prevent rotation thereof with respect to each other under the influence of the tensioned second wire so as to maintain the latter tensioned.

3. Apparatus as defined in claim 2 and wherein said first and second wires are arranged with the helical windings thereof turning in the same direction so that said other annular member and said third annular member may be turned in opposite directions with respect to each other to tension both of said wires.

References Cited in the file of this patent

UNITED STATES PATENTS

| 831,747 | Russell | Sept. 25, 1906 |
|---|---|---|
| 1,605,749 | McCarthy | Nov. 2, 1926 |
| 1,959,550 | Schmaier | May 22, 1934 |
| 2,143,279 | Osborn | Jan. 10, 1939 |
| 2,453,597 | Sarver | Nov. 9, 1948 |

FOREIGN PATENTS

| 532,465 | Germany | Aug. 6, 1929 |
|---|---|---|
| 146,338 | Switzerland | Apr. 15, 1931 |